(12) United States Patent
Hird

(10) Patent No.: US 6,258,236 B1
(45) Date of Patent: Jul. 10, 2001

(54) PROCESS FOR THE ELECTROCHEMICAL TREATMENT OF CONCRETE

(75) Inventor: Pamela Hird, Tamworth (GB)

(73) Assignee: Fosroc International Limited (GB)

( * ) Notice: Subject to any disclaimer, the term of this patent is extended or adjusted under 35 U.S.C. 154(b) by 0 days.

(21) Appl. No.: 09/446,924

(22) PCT Filed: Jul. 3, 1998

(86) PCT No.: PCT/GB98/01967

§ 371 Date: Jan. 28, 2000

§ 102(e) Date: Jan. 28, 2000

(87) PCT Pub. No.: WO99/01407

PCT Pub. Date: Jan. 14, 1999

(30) Foreign Application Priority Data

Jul. 3, 1997 (GB) ................................................. 9714047

(51) Int. Cl.[7] ................................................. C04B 41/00
(52) U.S. Cl. ........................ 204/515; 205/734; 205/766
(58) Field of Search ............................ 204/515; 205/734, 205/766

(56) References Cited

U.S. PATENT DOCUMENTS 5,320,722    6/1994    Miller .

FOREIGN PATENT DOCUMENTS

WO 87 06521   11/1987  (WO) .
WO 94/04474   * 3/1994  (WO) .

* cited by examiner

Primary Examiner—Arun S. Phasge
(74) Attorney, Agent, or Firm—Nixon & Vanderhye P.C.

(57) ABSTRACT

A process for the electrochemical realkalization of reinforced concrete comprises passing a direct electric current between an anode associated with a layer of alkaline electrolyte applied to an external surface of the concrete and a cathode which is located internally in the concrete. The process causes the internal pH of the concrete to increase and a surface layer of the concrete to be impregnated with the electrolyte solution and which comprises a solution of potassium carbonate of concentration at least 0.3 Molar. The process may be applied to concrete a zone of which has a pH of less than 10.0 and the process continued until the pH reaches a level of at least 10.5, preferably at least 11.0.

10 Claims, 1 Drawing Sheet

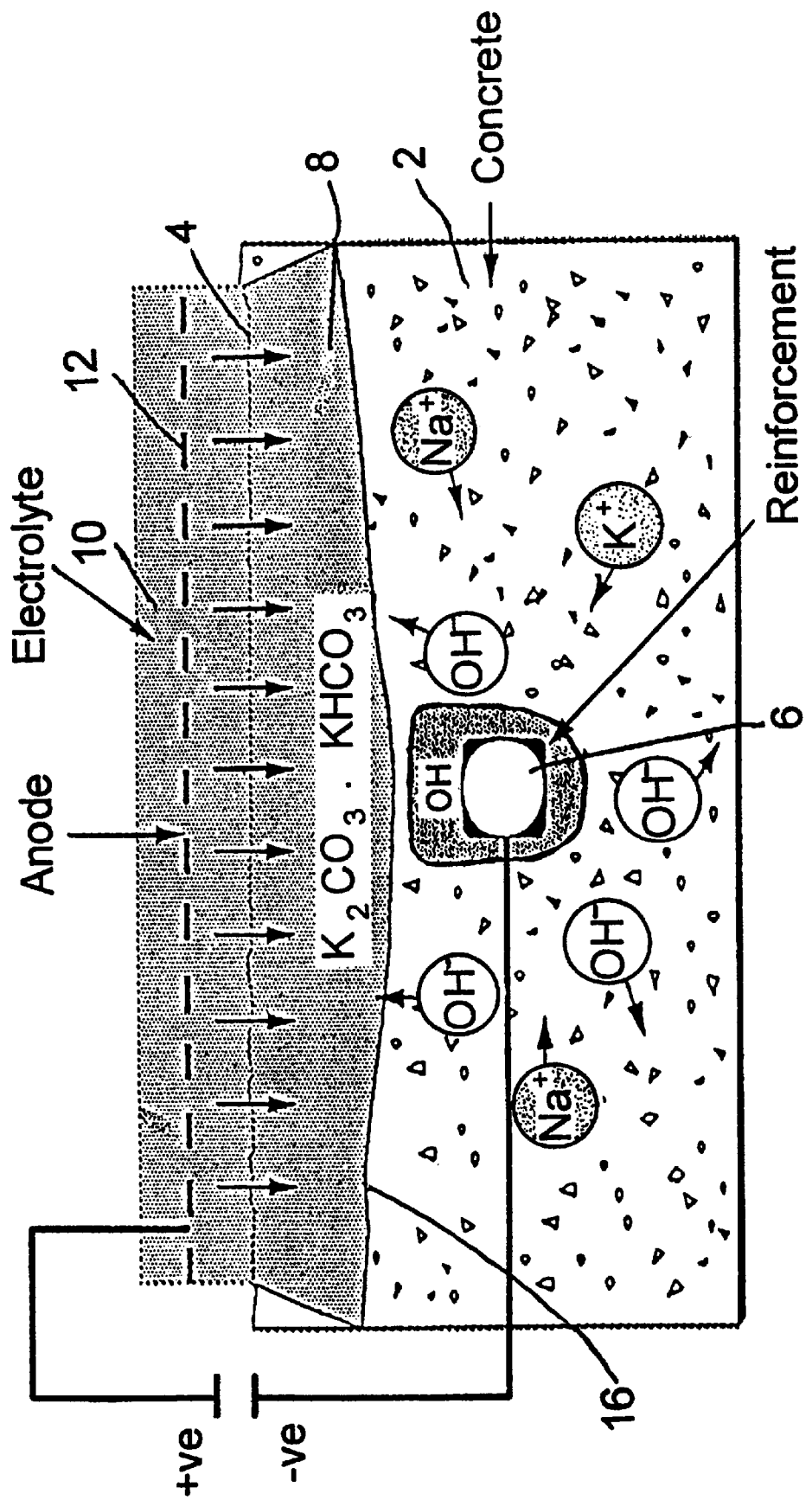

PROCESS FOR THE ELECTROCHEMICAL TREATMENT OF CONCRETE

This application is a 371 of PCT/GB98/01967 filed Jul. 3, 1998.

FIELD OF THE INVENTION

This invention relates to a process for the electrochemical treatment of reinforced concrete.

BACKGROUND OF THE INVENTION

In reinforced concrete the steel reinforcement is normally protected against corrosion by the alkaline environment in the concrete mass. Gradually however the alkalinity is reduced by the action of carbon dioxide and other gases in the atmosphere such as oxides of sulphur. The term given to this process is carbonation and concrete which has been subjected to the action of atmospheric gases is referred to as carbonated.

The effect is a gradual decrease in the pH and, if the process is allowed to continue, the pH will continue to fall and when it reaches a value of about 9.5 the steel is no longer protected against corrosion. Corrosion of the reinforcement may then take place leading to weakening of the reinforcement and spalling of the concrete.

A process for increasing the alkalinity of concrete which has been carbonated has been previously described, for example in European Patent No. 264,421 and U.S. Pat. No. 4,865,702. In this process an electric current is passed between an external electrode which is in contact with an alkaline electrolyte applied to the external surface of the concrete and the internal reinforcement of the concrete as cathode.

During the process there are two effects: the alkaline electrolyte moves into the concrete and the alkalinity is increased in the region of the cathode. The benefit of this is that the steel is repassivated and a layer of electrolyte which has permeated into the concrete maintains a cover zone over and around the steel of sufficiently high pH to keep the steel passive. This process has become known as realkalization.

As the alkaline electrolyte for this process there is proposed in European Patent No. 264,421 an aqueous solution of calcium, sodium and/or potassium salts either in a liquid or absorbed in a porous medium such as rock wool, cellulose, sawdust, sand, clay and the like or the electrolyte can be strongly retarded concrete, mortar, cement grout or lime paste. GB Patent Aplication No. 2,271,123A discloses a process in which sodium carbonate or sodium borate is used in the aqueous electrolyte. However in the operation of the process on a commercial scale the alkaline electrolyte that has been used is an aqueous solution of sodium carbonate.

PROBLEM TO BE SOLVED BY THE INVENTION

Although the results of the process using sodium carbonate solution as the alkaline electrolyte have been generally very successful, the surface of the concrete after the treatment, frequently shows efflorescence. This is a heavy crystalline salt deposit which is unsightly and is unsuitable for the application of a decorative coating. Consequently it is necessary to thoroughly clean the concrete after treatment to remove the efflorescence.

A solution to the above described problem has now been invented in which a solution of potassium carbonate is employed as the electrolyte.

SUMMARY OF THE INVENTION

According to the present invention a process for the electro-chemical realkalization of concrete comprises passing a direct electric current between an anode in contact with a layer of aqueous electrolyte applied to an external surface of the concrete and a cathode which is located internally in the concrete, to cause the internal pH of the concrete to increase and surface layer of the concrete to be impregnated with the electrolyte solution and wherein the electrolyte layer contains an aqueous solution of potassium carbonate at a concentration at least 0.3 Molar.

ADVANTAGEOUS EFFECT OF THE INVENTION

The advantage of the present invention obtained by the use of an aqueous solution of potassium carbonate as the alkaline electrolyte is that efflorescence on the external surface of the concrete after treatment is reduced or eliminated. This advantage could not have been predicted from the prior art and is therefore unexpected.

The FIGURE is an illustration of an electrolytic cell for the treatment of concrete.

DETAILED DESCRIPTION OF THE INVENTION

By external surface is meant a surface that is exposed to the atmosphere. The term electrolyte is intended to refer to the aqueous solution of potassium carbonate.

The anode may be immersed in the electrolyte solution or in some embodiments of the process associated with an adherent coating which comprises an organic water retaining material which forms an adhesive mixture with water.

The concentration of the potassium carbonate solution is preferably at least 0.5 Molar and solutions of concentration from 0.5 Molar up to saturation concentration are particularly suitable.

The potassium carbonate can be generated in situ from a source of potassium ions and a source of carbonate ions. For example, potassium hydroxide as the source of potassium ions and lithium carbonate as the source of carbonate ions may be added to the water to make up the electrolyte. Preferably however the electrolyte will be substantially free of ions other than those derived from the potassium carbonate and water although small quantities of other ions eg calcium, sodium and lithium (for example in the amounts that occur in commercially available forms of potassium carbonate) are acceptable. It is therefore convenient to add potassium carbonate (as the compound) to the water to make up the electrolyte. The potassium carbonate may be a general industrial grade material for example one containing at least 97% by weight of potassium carbonate on a dry basis.

It is preferred that the amount of sodium ions, if present, is less than 5% by weight of the potassium carbonate based on the dry weight of the potassium carbonate, because the inventors have found that sodium carbonate is the material which causes the efflorescence on the concrete surface after treatment.

Preferably the pH of the electrolyte at the commencement of the process is in the range 10.5 to 12.5, more preferably 10.9 to 12.0.

The electrolyte may be maintained in contact with the external surface of the concrete by an adherent coating which comprises an adhesive mixture of an organic water retaining material and water.

Alternatively the electrolyte is maintained in contact with the external surface of the concrete by means of a tank which holds the electrolyte and is removably secured to the concrete.

When an adherent coating is used the adhesive mixture may be applied by spraying and the mixing of the water with the composition containing potassium carbonate and the water retaining material effected in the spraying process.

The water retaining material is conveniently a cellulosic fibre, for example, as described in European Patent No. 398,117 or U.S. Pat. Nos. 5,198,082; 5,228,959; and 5,407,543 and suitably the composition of cellulosic fibre and potassium carbonate contains at least 10% by weight of potassium carbonate based on the dry weight of cellulosic fibre, preferably from 20 to 150% by weight of potassium carbonate based on the dry weight of cellulosic fibre.

The adhesive mixture conveniently contains more potassium carbonate than is required to saturate the water present in the mixture. In this case the coating will contain undissolved potassium carbonate which acts as a reservoir to for replenishment of the electrolyte. In this case replenishment may be effected by addition of water for example by spraying the coating at intervals. When the electrolyte solution is contained in a tank, replenishment may be effected by addition of fresh solution to the tank.

During the process the electrolyte may be replenished. Conveniently the water retaining material can hold at least 100% its own weight of water and preferably at least 200%, more preferably at least 300% for example 300 to 500%.

When the water retaining material is a cellulosic fibre, the fibre can be premixed with the potassium carbonate, e.g. at a factory so that on the site only water needs to be added to the fibre.

For use in the present invention the dry fibre is conveniently mixed with the potassium carbonate (as a solid) in the process for the preparation of the fibre e.g. the milling of the cellulose and supplied to the job site as a mixture where it is mixed with water, for example, by supplying the cellulose fibre/potassium carbonate mixture and water as two components to a suitable spray nozzle in which they are mixed and from which is emitted a spray containing a mixture of the two.

The cellulosic fibres may be recycled or reconstituted cellulose pulp. Conveniently the cellulose pulp is derived from newsprint or other waste paper. Processes for the production of cellulose fibres are known in the art and are in commercial operation. Cellulose fibre is known as a replacement for asbestos fibres in a number of applications such as panels, tile adhesive, refractory linings and especially fibre cement panels.

In a typical process for the preparation of cellulose fibres the feed in the form of waste newsprint in sheet form is passed to a shredder from where the shredded paper is passed through the first of two hammer mills such as a Jacobson mill. The mill has rotating hammers or blades which together with air suction force the material through a perforated metal screen. The material, which at this point is partly fibrised, is passed to a second hammer mill. At a point between the two hammer mills chemicals such as fire retardants are added. In the preparation of fibre for use in the present invention the potassium carbonate is added at this point. The material is then passed through the second hammer mill in which it is further fibrised. The product is then compressed and extruded into bags for storage. The fibres after leaving the second hammer mill usually have a length of between 0.5 and 2.0 mm. The freeness of the fibres may be in the range 45 to 75o SR (Shopper-Riegler).

The cathode is conveniently connected to, or provided by, the reinforcement of the concrete.

The process is particularly suitable for use with concrete that has been carbonated to a pH of 10.5 or less, such as 10.0 or less, especially 9.5 or less, since at this pH the steel of the reinforcement is no longer protected against corrosion.

The process of the present invention can be carried out as described in European Patent No. 264,241 and U.S. Pat. No. 4,865,702.

For example the applied voltage between anode an cathode can conveniently be from 3 to 40 volts conveniently from 6 to 20 volts and is usually adjusted to provide a current density in the range from 0.15 to 6 preferably from 0.5 to 2.5 amps per square meter of concrete surface.

The alkalinity can be monitored by measuring the pH e.g. by means of an indicator such as phenolphthalein sprayed onto freshly broken concrete and when the desired pH has been reached e.g. a pH of greater than 10.5, usually greater than about 11, the process can be stopped.

Since loss of alkalinity is caused by atmospheric gases such as carbon dioxide, for a concrete that has weathered, the pH at or near the surface will often be lower than that further into the concrete body and the pH in the immediate vicinity of the reinforcement may still be sufficiently high to provide passivation of the steel. It is within the scope of the present invention to realkalize such concrete.

Although the pH of the concrete may vary through its thickness any zone may be chosen as the zone whose pH is measured to determine whether to realkalize the concrete. The zone whose pH is measured to determine the end of the process will usually be the same distance from the surface as the first chosen zone.

The process may comprise measuring the pH of a chosen zone of the concrete and when the pH is 10.0 or less, carrying out the process as described above and, after a period of time measuring the pH again, and when the pH is 10.5 or more stopping the passage of the electric current.

The anode which can comprise wires, cords, plates, foil or sheet metal and its associated electrolyte can be preformed and applied to the concrete surface as an assembly.

The anode can be a consumable metal such as steel or an inert metal such as titanium.

The electrolyte is conveniently maintained in contact with the concrete surface by means of a tank which holds the electrolyte and which is removably secured to the concrete surface. The use of a holding tank enables the electrolyte to be maintained in contact with sloping, vertical and overhead surfaces and enables the process to be applied to the underside of concrete structures such as soffits or ceilings and the like.

Referring to the drawing a body of concrete 2 has an external surface 4, steel reinforcement 6 and a zone 8 adjacent to the surface 4 which has been carbonated. Maintained in contact with the external surface 4 by means of a removable tank (not shown) is an electrolyte 10 which is a 1 Molar aqueous solutuion of potassium carbonate. Immersed in the electrolyte 10 is a steel anode 12. In operation of the process of the present invention a voltage is applied between the reinforcement 6 as cathode and the steel anode 12 to provide a direct current at a current density of 1 amp per square meter of concrete surface.

Electrolyte 10 penetrates the surface 4 of the concrete and into the concrete as indicated by the downward pointing arrows. A front of advancing electrolyte is indicated at 16. This is shown as a mixture of potassium carbonate and bicarbonate because potassium carbonate is converted by carbon dioxide in the atmosphere to the mixture (not necessarily in equimolar proportions). Under the influence of the electric current the ions move in the directions indicated ie potassium and sodium ions move towards the cathode and hydroxyl ions towards the anode.

The invention is illustrated by the following Example.

EXAMPLE 1

A reinforced concrete structure that had been carbonated by exposure to the atmosphere over a period of years and whose pH in the vicinity of the steel reinforcement had fallen to about 9.5 was subjected to the following treatment.

The concrete structure treated was a reinforced concrete soffit (this provides an overhead surface). For the treatment of this overhead area a tank was used to hold the electrolyte so that the latter was maintained in direct contact with the concrete surface. The tank of dimensions 1100 mm×900 mm×10 mm was made of 4 mm perspex sheet with 40 mm×25 mm polyethylene or neoprene seals at the edges and included a 20 mm×20 mm mild steel frame to provide rigidity and compress the seals. The tank was secured to the concrete by means of bolts. The tank contained a one Molar aqueous solution of potassium carbonate whose pH was 12.0.

A mixed metal oxide coated titanium mesh (210 grade) was held in the tank immersed in the electrolyte solution and connected to the positive terminal of a source of direct current whilst the reinforcement was connected to the negative terminal. The voltage was adjusted to provide a current density of one amp per square meter of concrete surface and was applied for 4 days. The pH of the concrete in the zone between the reinforcement and the concrete surface was measured after treatment using a phenolphthalein indicator made up in water and ethanol which was turned bright pink indicating a pH of about 11.

The tank containing the electrolyte solution was removed and the external surface of the concrete inspected after drying. No efflorescence was observed.

The Example was repeated exactly as described above except that a 1 Molar solution of sodium carbonate was employed. After removal of the tank and drying, the surface was inspected and efflorescence was observed, which it would be necessary to remove before applying a decorative coating.

Experimental work has found that potassium carbonate has further advantages over sodium carbonate:
(i) potassium carbonate solution penetrates into the concrete faster than sodium carbonate under identical conditions and molar concentrations. This means that the pH of the concrete layer adjacent to the surface is increased more quickly.
(ii) potassium carbonate has far better solubility properties at low temperature. For example at 4 degrees Centigrade sodium carbonate at a saturated solution is below 1 Molar. Potassium carbonate however has a saturated solution of over 5 Molar at this temperature. This is significant since one of the main applications of this invention is for the treatment of the external surfaces of buildings and other concrete structures and means that potassium carbonate can be more reliably used during the winter.

What is claimed is:

1. A process for the electro-chemical realkalization of reinforced concrete comprising passing a direct electric current between an anode in contact with a layer of aqueous alkaline electrolyte applied to an external surface of the concrete and a cathode which is located internally in the concrete, to cause the internal pH of the concrete to increase and a surface layer of the concrete to be impregnated with the electrolyte solution and wherein the aqueous electrolyte solution comprises an aqueous solution of potassium carbonate of concentration at least 0.3 Molar.

2. A process as claimed in claim 1 wherein the electrolyte is maintained in contact with the external surface of the concrete by an adherent coating which comprises an adhesive mixture of an organic water retaining material and water.

3. A process as claimed in claim 2 wherein the adhesive mixture contains more potassium carbonate than is required to saturate the water present in order to provide a reservoir of potassium carbonate to replenish the electrolyte.

4. A process as claimed in claim 2 wherein the water retaining material is a cellulosic fibre and the amount of potassium carbonate present is at least 10% based on the combined dry weight of the cellulosic fibre and potassium carbonate.

5. A process as claimed in claim 4 wherein the amount of potassium carbonate present is from 20 to 150% by weight based on the combined dry weight of cellulosic fibre and potassium carbonate.

6. A process as claimed in claim 1 wherein the electrolyte is maintained in contact with the external surface of the concrete by means of a tank which holds the electrolyte and is removably secured to the concrete.

7. A process as claimed in claim 1 wherein the applied voltage between anode an cathode is from 3 to 40 volts and the current density is from 0.15 to 6 amps per square meter of concrete surface.

8. A process as claimed in claim 7 wherein the applied voltage is from 5 to 20 volts and the current density from 0.5 to 2.5 amps per square meter.

9. A process as claimed in claim 1 wherein the process is applied to concrete a zone of which has a pH is less than 10.0.

10. A process as claimed in claim 9 wherein the process is continued until the pH reaches a level of at least 10.5, preferably at least 11.0.

* * * * *